United States Patent [19]
Monji et al.

[11] Patent Number: 5,276,538
[45] Date of Patent: Jan. 4, 1994

[54] DISPLAY DEVICE WITH MICRO LENS ARRAY

[75] Inventors: Hideto Monji, Osaka; Kiyoshi Kuribayashi, Neyagawa; Makoto Umetani, Izumi, all of Japan

[73] Assignee: Matsushita Electric Industrial Co., Ltd., Osaka, Japan

[21] Appl. No.: 678,155

[22] Filed: Apr. 2, 1991

[30] Foreign Application Priority Data

| Apr. 5, 1990 | [JP] | Japan | 2-90802 |
| Apr. 5, 1990 | [JP] | Japan | 2-90803 |
| Apr. 27, 1990 | [JP] | Japan | 2-113309 |

[51] Int. Cl.⁵ .............. G02B 27/00; G02B 1/00; G02F 1/1335; G03B 21/60
[52] U.S. Cl. .................. 359/40; 359/36; 359/454; 359/620; 359/642
[58] Field of Search ........... 359/618, 619, 620, 621, 359/622, 623, 624, 625, 626, 627, 628, 741, 796, 797, 454, 455, 456, 457, 458, 459, 36, 40, 54, 642; 65/37, 39, 45, 47, 48

[56] References Cited

U.S. PATENT DOCUMENTS

| 1,943,995 | 1/1934 | Weld | 359/455 |
| 3,851,093 | 11/1974 | Sunstein | 359/628 X |
| 4,468,420 | 8/1984 | Kawahara et al. | 428/428 X |
| 4,733,096 | 3/1988 | Horiguchi | 250/216 X |
| 4,804,253 | 2/1989 | Stewart | 359/619 X |

FOREIGN PATENT DOCUMENTS

| 0191618 | 8/1986 | European Pat. Off. . |
| 60-165624 | 8/1985 | Japan . |
| 60-264334 | 12/1985 | Japan . |
| 64-35416 | 2/1989 | Japan . |

OTHER PUBLICATIONS

"Patent Abstracts of Japan", 13(480), (P-952)(3828-)(Oct. 31, 1989) (abstract of JP-A-1 189 685, Jul. 28, 1989).

"Patent Abstracts of Japan", 14(208), (C-714) (4151) (Apr. 27, 1990) (abstract of JP-A-2 044 033, Feb. 14, 1990).

"Patent Abstracts of Japan", 10(9), (P-420) (2066) (Jan. 14, 1986) (abstract of JP-A-60 165 623, Aug. 28, 1985).

*Primary Examiner*—Bruce Y. Arnold
*Assistant Examiner*—David R. Parsons
*Attorney, Agent, or Firm*—Wenderoth, Lind & Ponack

[57] ABSTRACT

An array of optical microelements is produced by press molding, at a high temperature, a transparent glass with a press mold which has a molding surface formed into a shape corresponding to the optical microelement array and coated with a chemically stable thin film.

9 Claims, 5 Drawing Sheets

DISPLAY DEVICE WITH MICRO LENS ARRAY

BACKGROUND OF THE INVENTION

1. Field of the Invention

The present invention relates to an array of optical microelements such as micro-lenses, usable for a display device including a liquid crystal display, a plasma display and an electro-luminescence display, and a method of producing such microelement array, and further, a display device using the microelement array.

2. Description of the Prior Art

Recently, as thin type display devices replacing CRT (Cathode Ray Tube), various kinds of devices have been proposed, and among them, an active matrix liquid crystal display on which thin film transistors (TFT) are formed for respective pixels, this focuses attention, in particular, on the thin type display device with large color display capacity. In such device, light from a light source is transmitted through an opening area of each pixel, so that the permeability depends on the opening factor (vignetting factor) of the pixels. When, for the liquid crystal display with very fine accuracy, very small pixels are formed in high density, an area of the TFT occupying the pixels becomes relatively large because there is a limit for reducing the size of the TFT. In other words, the opening area through which the light is transmitted becomes small (drop of opening factor), and the transmitted light is decreased. Display quality becomes poor because the display becomes dark due to the decrease in the transmitted light. As a method to solve the problem, effective usage of light, formerly absorbed by wiring needed to form the TFT and shields, is achieved by converging the light, with a lens to the opening area of the pixel. For example, in Japanese laid-open patent application No. 60-165624, there is a description that conventional machining is made on a glass substrate itself to from spherical microlenses. In Japanese laid-open patent application No. 60-264334, there is a description that the lenses are formed by creating fine patterns made of glass with melting point lower than that of the substate and deforming them with surface tension caused by melting into semi-circular shapes. Or, in Japanese laid-open patent application No. 1-189685, there is a description that microlenses are formed by pressing a thermoplastic resin to make it adhere to a polished glass substrate.

However, in the case of Japanese laid-open patent application No. 60-165624, around one million microlenses are needed for a 3 inch-sized ultra-high density liquid crystal display, but forming an extremely large number of the microlenses, totaling around one million, by such a method is very difficult, or the mass production is impossible. In the case of Japanese laid-open patent application No. 60-264334, the semi-circular is made with the surface tension caused by melting, but controlling curvature of the lens is difficult, so that the method is inferior in degree of freedom and reliability. In the Japanese laid-open patent application No. 1-189685, resin, an organic compound, is used for the portion of the microlenses. Generally, the coefficient of thermal expansion of the resin, the organic compound, is around one figure larger compared to that of the glass substrate, and degree of the expansion and contraction, due to a charge of temperature, is great. Consequently, there occur problems for the microlenses formed on the glass substrate that, with usage for a long time, positions to be kept in high precision between the pixels and the microlenses are shifted, the curvature of the lens changes or the microlens array separates from the glass substrate.

SUMMARY OF THE INVENTION

An object of the present invention is to provide an optical element in which optical microelements of glass are arrayed, a production method of the optical microelement array, and a display device using the optical microelement array.

To attain the above object, the present invention produces an array of glass optical microelements by applying hot press-molding to a transparent glass using a mold with a molding surface having a shape corresponding to a desired microelement array and coated with a chemically stable thin film.

In one preferred method, an optical device in which desired optical microelements are arrayed on a transparent glass substrate is produced by press-molding a low melting point glass on a high melting point transparent glass substrate with a press-molding mold.

In another preferred method, an optical device comprising a glass substrate, a low melting glass layer formed on the substrate, and arrayed optical microelements formed on the glass layer, is produced by press-molding a high melting point transparent glass substrate coated with a low melting point glass layer, with the mold above.

Or, when a desired optical microelement array is molded on one surface of a transparent low melting point glass substrate, an alkali elution preventive layer may be formed on the other surface of the tansparent glass substrate.

In another aspect of the present invenion, an array of optical microelements obtained from the above production method is disposed corresponding to respective pixels in a display device such as a liquid crystal display.

A bright display surface, of a display device with high display quality, is realized by the optical microelement array molded on a transparent glass substrate, which can collect light at the opening area and in the vicinities of the opening area to the opening area of each pixel.

In still another aspect of the present invention, there is provision of a mold used for press molding, which is formed according to the shape of a desired optical microelement array and coated with a chemically stable thin film. By applying hot press molding to a transparent glass substrate with the mold, mass production of optical microelement arrays with high precision can be realized.

DESCRIPTION OF THE PREFERRED EMBODIMENTS

Figure 1:
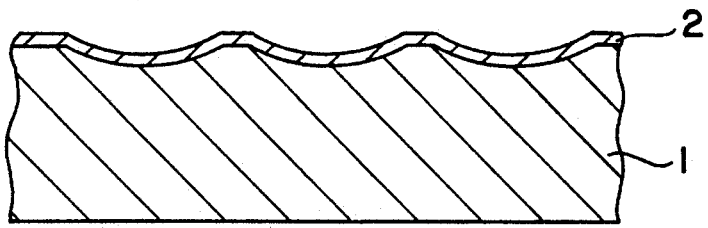
FIG. 1 is a sectional view of a mold used for press molding, according to the present invention.

FIG. 1 is a sectional view of a mold, according with the present invention, used for press forming. A hard indenter such as a diamond or a sapphire, formed to a desired profile with high precision in advance, is pressed to a base material 1 while applied with numerical control to create a matrix lens array on the molding surface with plastic deformation. Or, as regards a striped lens like a lenticular lens, machining is made by scanning, to the base material 1, the indenter formed to a desired profile with high precision in advance, while numerically controlled. Hereupon, as the base material 1, super hard alloy, cermet or stainless steel, which is profiled with ease and heat-resistant, is suitable. Such fine machined molding surface of the base material 1 is coated with a chemically stable thin film 2. The chemically stable thin film 2 is preferably selected from a noble metal, tungsten, tantalum, rhenium or hafnium, or their alloy. Such thin film 2 is formed homogeneously and densely by a sputtering method, an ion-plating method or a plating method.

Or, the following method is also available. More deformable material (for example, electroless Ni plating) is formed on the molding surface of the base material 1 as an intermediate layer, and applied with press forming or machining while precise numerical control is applied, and then coated with the chemically stable thin film 2 mentioned above.

Figure 2:
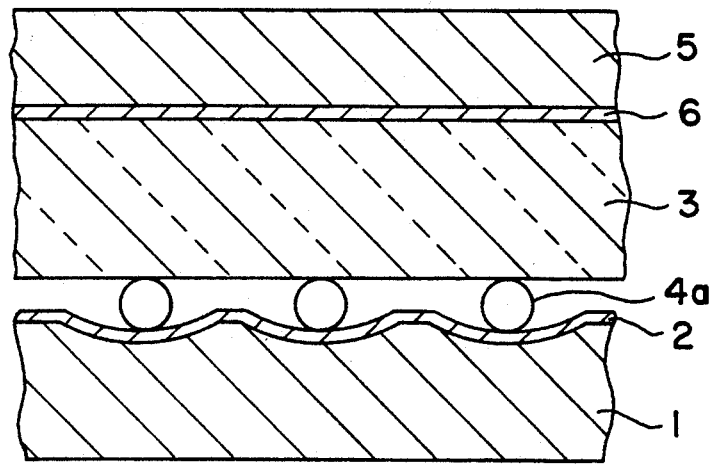
FIG. 2 is a sectional view showing press molding conditions of an optical microelement array of an embodiment of the present invention.
Figure 3:
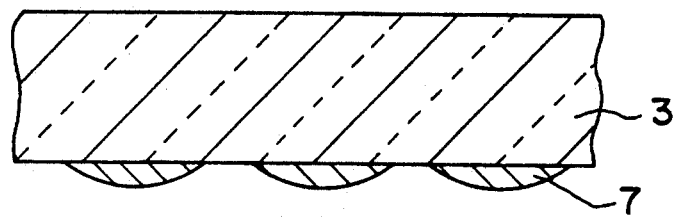
FIG. 3 is a sectional view of an optical microelement array produced in the FIG. 2 method.

FIG. 2 is a sectional view showing a press molding method for a microlens array, according to the present invention, and FIG. 3 is a sectional view of an optical element molded by this method. As shown in FIG. 2, a press mold 5 with a plane molding surface coated with a thin film 6, a transparent glass substrate 3, a low melting point spherical glass 4a and a press mold with a molding surface formed into an array of concaves, are disposed in sequence from the top, and press molded in a molding machine at a high temperature in a non-oxidizing atmosphere. As a result, an optical element with a microlens array 7 molded on the transparent glass substrate 3 is obtained as shown in FIG. 3.

Figure 5:
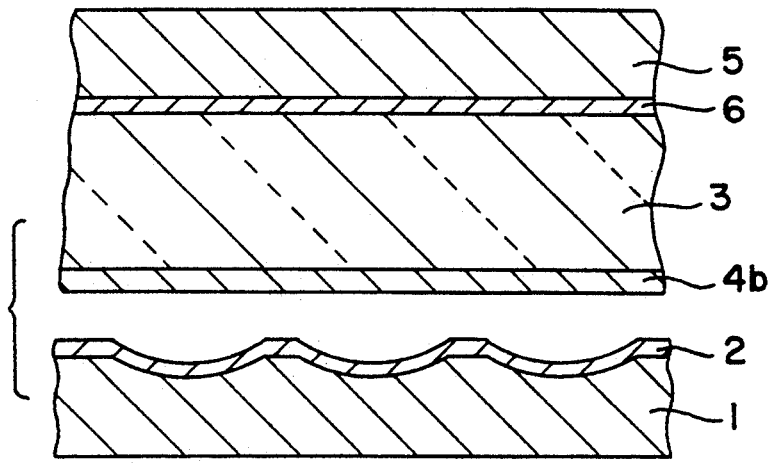
FIG. 5 is a sectional view showing press molding conditions of an optcal microelement array of another embodiment of the present invention.
Figure 6:
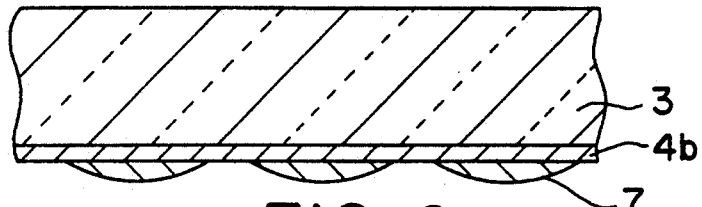
FIG. 6 is a sectional view of an optical microelement array produced in the FIG. 5 method.

FIG. 5 is a sectional view showing another press molding method for a microlens array, according to the present invention, and FIG. 6 is a sectional view showing an optical element molded by this method. As shown in FIG. 5, a press mold 5 with a plane molding surface coated with a thin film 6, a transparent glass substrate 3 coated with a low melting point glass layer 4b, and a press mold with a molding surface formed into an array of concaves, are disposed in sequence from the top, and press molded in a molding macchine at a high temperature in a non-oxidizing atmosphere. Hereupon, the low melting point glass layer 4b can be formed on the transparent glass substrate 3 by a sputtering method, a chemical vapor deposition method, a doctor blade method or a dipping method. As a result, a part of the low melting point glass layer 4b is molded into a microlens array 7 as shown in FIG. 6.

Figure 8:
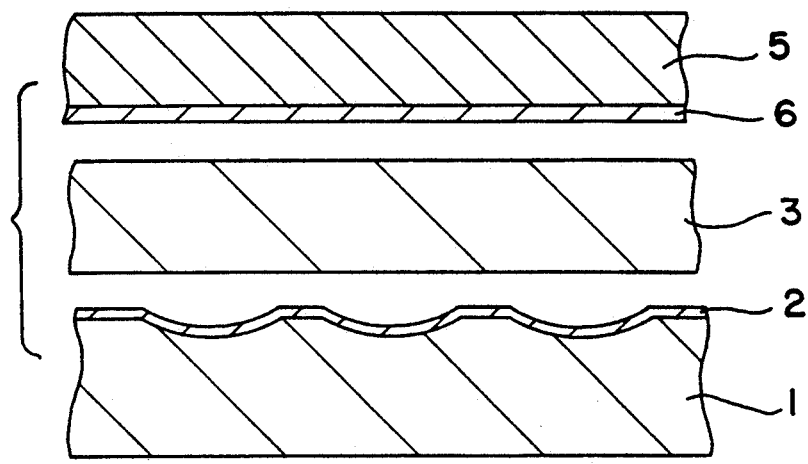
FIG. 8 is a sectional view showing press molding conditions of an optical microelement array of still another embodiment of the present invention.
Figure 9:
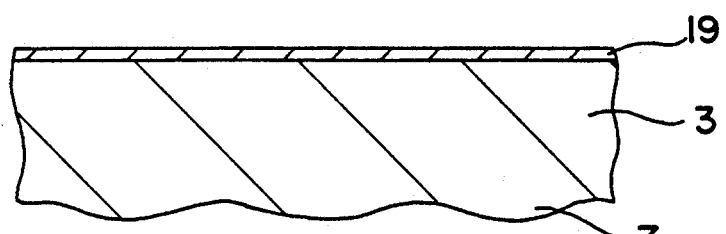
FIG. 9 is a sectional view of an optical microelement array produced in the FIG. 8 method.

FIG. 8 is a sectional view showing still another press forming method for a microlens array, according to the present invention, and FIG. 9 is a sectional view showing an optical element molded by this method. As shown in FIG. 8, a press mold 5 with a plane molding surface coated with a thin film 6, a transparent glass substrate 3 and a press mold with a molding surface formed into an array of concaves, are disposed in sequence from the top, and press molded in a molding machine at a high temperature in a non-oxidizing atmosphere. An alkali elution preventive layer 19 is formed on the back surface of the transparent glass substrate 3, opposite to the surface on which a microlens array 7 is formed. The alkali elution preventive layer 19 can be formed on the transparent glass substrate 3 by a sputtering method, a chemical vapor deposition method, a doctor blade method or a dipping method. In this way, the optical element can be obtained from the transparent glass substrate 3, on which the microlens array 7 is formed on one surface and the alkali elution preventive layer 19 is formed on the other surface.

Figure 4:
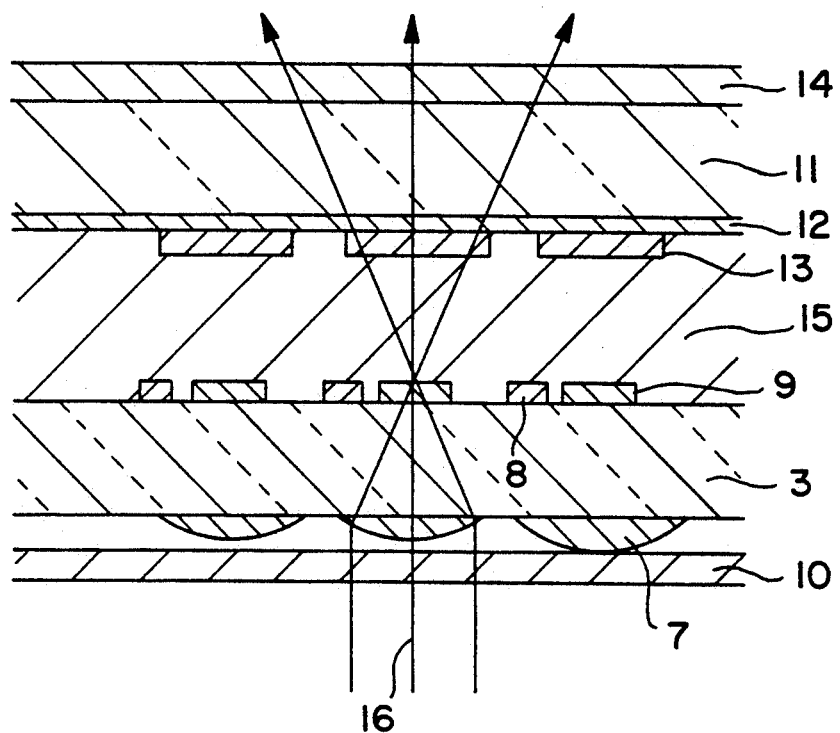
FIG. 4 is a sectional view of a display device using an optical microelement array of FIG. 3.

FIG. 4 is a sectional view showing a display device of the present invention. A plurality of thin film transistors (TFT) 8 made of amorphous silicon and a plurality of transparent pixel electrodes made of ITO composing pixels, are formed, as shown in FIG. 4, on a surface of a transparent glass substrate 3, opposite to a surface molded into a microlens array. A polarizing plate 10 is disposed on the surface with the microlens array 7. A common electrode 12 made of ITO is formed on one surface of a plate-like transparent glass substrate, and a color filter 13 is provided at a location corresponding to that of a transparent pixel electrode 9, on the common electrode 12. A polarizing plate 14 is provided at the other side of the substrate. The transparent glass substrates 3 and 11 with such structure are fixed together with an adhesive (not shown), and the gap therebetween is injected and filled with a liquid crystal material 15. In such display device, when incident light 16 is entered in parallel and a voltage is applied between the common electrode 12 and the transparent electrode 9 composing the pixels, the light passes through the liquid crystal material 15 without a polarized wave plane changed. When the voltage is off, the polarized wave plane turns by 90 degree and cannot pass the liquid crystal material 15.

The radius of curvature of the microlens array 7 is prepared so that the focal point of each lens is located at a position of a corresponding transparent pixel electrode 9. The incident light having passed through the microlens array 7, is collected at the transparent pixel electrode 9, the opening area, and then passes through the common electrode 12 and the transparent glass substrate 11. As clear from FIG. 4, when the incident light 16 is entered in parallel, it is not shielded by the thin film transistor, so that almost all light passes through the transparent pixel electrode 9, the opening area and effectively contributes to the display. Accordingly, opening factor substantially becomes great, so that clear, high quality display is produced.

Figure 7:
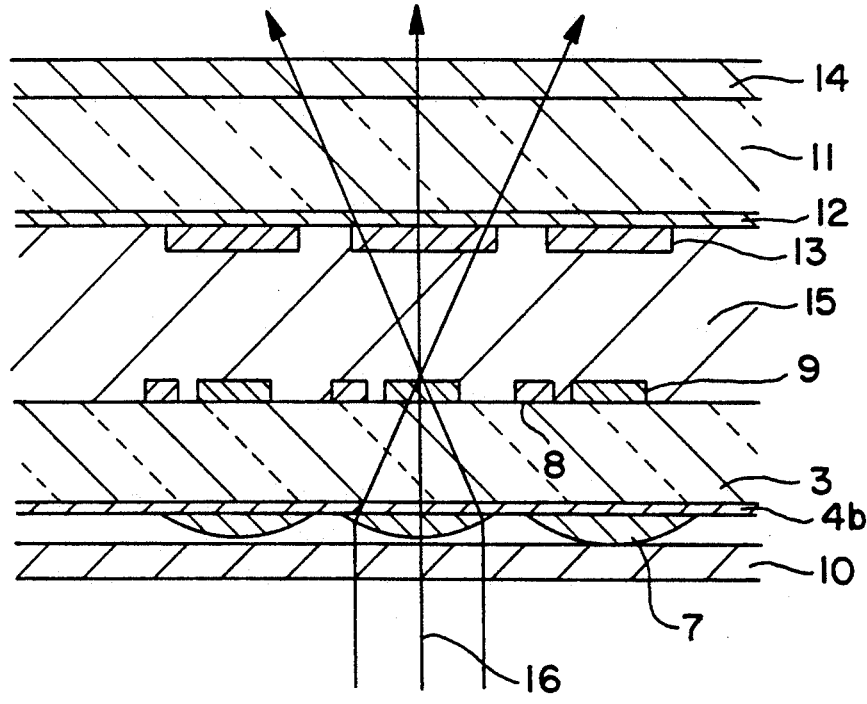
FIG. 7 is a sectional view of a display device using an optical microelement array or FIG. 6.
Figure 10:
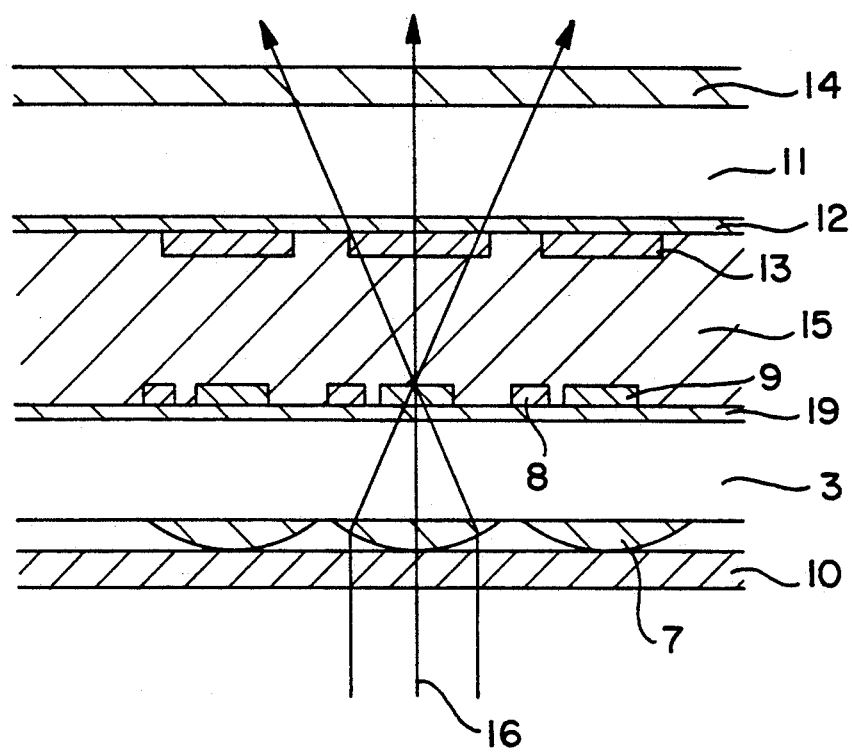
FIG. 10 is a sectional view of a display device using an optical microelement array of FIG. 9.

FIG. 7 is a sectional view showing another display device of the present invention. The thin film transistors (TFT) 8 made of amorphous silicon and the transparent pixel electrodes 9 made of ITO, are formed on the optical element which is produced by molding, on the transparent glass substrate 3 shown in FIG. 6, the microlens array 7 and the low melting point glass layer 4b. The other structure and display operation are the same as in FIG. 4. FIG. 10 is a sectional view showing still another display device of the present invention. The thin film transistors (TFT) 8 made of amorphous silicon and the transparent pixel electrodes 9 made of the ITO, are formed on the optical element which is produced by molding, on the transparent glass substrate 3 shown in FIG. 9, the microlens array 7 and alkali elution preventive layer 4b. The other structure and display operation are the same as in FIG. 4.

Example 1

As the base material 1 for a press mold, super hard alloy (WC-5TiC-8Co) was used, cut into a plate with 50 mm×40 mm×10 mm in dimensions, and, lapped and polished with super-fine diamond powder to obtain a mirror-like surface with around 2 nm in root mean square roughness (RMS). On the mirror-like surface of the base material 1, around 0.8 million concave microlenses were formed at 40 μm pitch by pressing a diamond indenter with 400 μm in radius of curvature with a press molding machine numerically controlled in high precision. This microlens array molded surface was coated, by a sputtering method, with a thin film of platinum-iridium-osmium (Pt-Ir-Os) alloy to obtain a press mold shown in FIG. 1. FIG. 2 shows a press molding method for a microlens array, used in this example. In FIG. 2, 3 is a transparent glass substrate (Corning 7059, 40 mm×30 mm×1.1 mm), the surface of which is polished, and 4a is a low melting point spherical glass made of a borosilicate barium glass comprising 30 weight % of silica ($SiO_2$), 50 weight % of barium oxide($B_2O_3$), 15 weight % of boric acid($B_2O_3$) and the remainder of trace materials. 5 is a plate-like press mold, and 6 is a thin film of platinum-iridium-osmium (Pt-Ir-Os) alloy on the base material 5, and they were prepared by the same method as was used for the former press mold.

As shown in FIG. 2, the press mold 5 with a plane molding surface, the transparent glass substrate 3, the glass layer 4a, and the press mold with an array of concaves on the molding surface, were disposed in sequence from the top, and press molded in a molding machine at a high temperature, inside of which was kept in a non-oxidizing atmosphere by flowing 20 l/min of nitrogen gas. Press molding conditions were as follows: temperature of the mold 560° C.; pressure of the press 30 kg/cm²; press time 1 min. After the press molding, the glass and the press mold were slowly cooled down to 300° C. to obtain an optical element in which the microlens array was molded on the transparent glass substrate 3, as shown in FIG. 3.

Thin film transistors (TFT) 8 made of amorphous silicon and transparent pixel electrodes made of ITO composing pixels, were formed, as shown in FIG. 4, on the surface of the transparent glass substrate 3, opposite to that molded into the microlens array. A polarizing plate 10 was provided on the surface with the microlens array 7. A common electrode 12 made of ITO was provided on one entire surface of a plate-like transparent glass substrate 11, and a color filter 13 was provided at the location corresponding to that of the transparent pixel electrode 9, on the common electrode 12, and a polarizing plate 14 was provided on the other side of the substrate 11. The transparent glass substrates 3 and 11 with such structure were fixed together with an adhesive (not shown), and the gap therebetween was filled with a liquid crystal material 15. The microlens array 7 was formed to focus at a position of the transparent pixel electrode 9 so that the incident light 16 having passed through the microlens array 7 can be collected at the transparent pixel electrode 9, the opening area, and then passed through the common electrode 12 and the transparent glass substrate 11. As clear from FIG. 4, when the incident light 16 was entered in parallel, it was not shielded by the thin film transistor, so that almost all light passed through the transparent pixel electrode 9, the opening area to effectively contribute to display. Accordingly, the opening factor substantially became great, so that a clear, high quality display was produced.

Example 2

As the base material 1 for a press mold, super hard alloy (WC-5TiC-8Co) was used, cut into a plate with 50 mm×40 mm×10 mm in dimensions, and, lapped and polished with super-fine diamond powder to obtain a mirror-like surface with around 2 nm in root mean square roughness (RMS). The mirror-polished surface of the base material 1 was applied with 7 μm electroless Ni plating. With a cutting device high precisely numerically controlling a diamond bite with 100 μm in radius of curvature, concave lenticular lenses (microlenses) with 5 μm in sag were produced at a pitch of 40 μm on the electroless Ni plated surface. Then, the electroless Ni plating layer was removed by uniformly etching it with an ECR ion shower etching device. The obtained surface was coated with a platinum-iridium-osmium alloy (Pt-Ir-Os) thin film 2 to obtain a press mold.

In FIG. 5, 3 is a transparent glass substrate (Corning 7059, 40 mm×30 mm×1.1 mm), the surface of which is polished, and 4b is a low melting point glass made of a borosilicate barium glass comprising 30 weight % of silica ($SiO_2$), 50 weight % of barium oxide(BaO), 15 weight % of boric acid ($B_2O_3$) and the remainder of trace materials, the film of which was formed on the substrate to be 3 μm thick by a sputtering method. 5 is a plate-like press mold, and 6 is a thin film of platinum-iridium-osmium (Pt-Ir-Os) alloy on the base material 5, and they were prepared by the same method as was used for the press metal mold above.

As shown in FIG. 5, the press mold 5 with a plane molding surface, the transparent glass substrate 3, the low melting point glass layer 4b, and the press mold with an array of concaves on the molding surface, were disposed in sequence from the top, and press molded in a molding machine at a high temperature, inside of which was kept in a non-oxidizing atmosphere by flowing 20 l/min of nitrogen gas. Press molding conditions were as follows: temperature of the mold 560° C.; pressure of the press 30 kg/cm²; press time 1 min. After the press molding, the glass and the press mold were slowly cooled down to 300° C. to obtain on optical element in which the microlens array 7 and the low melting point glass layer 4b were formed on the transparent glass substrate 3, as shown in FIG. 6.

Thin film transistors (TFT) 8 made of amorphous silicon and transparent pixel electrodes made of ITO composing pixels, were formed, as shown in FIG. 7, on the surface of the transparent glass substrate 3, opposite to that molded into the microlens array on the low melting point glass layer 4b, and a polarizing plate 10 was provided on the surface with the microlens array 7. The other structure concerned with the display device was the same as in Example 1. As a result, as in Example 1, incident light 16 entered through the microlens array was collected at the transparent pixel electrode 9, the opening area, and the opening factor (vignetting factor) substantially became great, so that a clear, high quality display was produced.

Example 3

As the base material 1 for a press mold, cermet (TiC-10Mo-9Ni) was used, cut into a plate with 50 mm×40 mm×10 mm in dimensions, and, lapped and polished with super-fine diamond powder to obtain a mirror-like surface with around 2 nm in root mean square roughness (RMS). On the mirror-like surface of the base material 1, around 0.8 million concave microlenses were molded at 40 μm pitch by pressing a diamond indenter with 400 μm in radius of curvature with a press molding machine numerically controlled in high precision. This microlens array molded surface was coated, by a sputtering method, with a thin film of rhodium-gold-tungsten (Rh-Au-W) alloy to obtain a press mold. In FIG. 2, 3 is a transparent glass substrate (silica glass, 40 mm×30 mm×1.1 mm), the surface of which is polished, and 4a is a low melting point spherical glass made of a lanthanum base glass comprising 8 weight % of zirconia ($ZrO_2$), 30 weight % of lanthanum oxide ($La_2O_3$), 42 weight % of boric acid ($B_2O_3$), 10 weight % of calcium oxide (CaO) and the remainder of trace materials. 5 is a plate-like press mold, and 6 is a thin film of rhodium-gold-tungsten (Rh-Au-W) alloy on the base material 5, and they were prepared by the same method as was used for the press mold 1 and 2.

As shown in FIG. 2, the press mold 5 with a plane molding surface, the transparent glass substrate 3, the low melting point spherical glass 4a, and the press mold with an array of concaves on the molding surface, were disposed in sequence from the top, and press molded in a molding machine at a high temperature, inside of which was kept in a non-oxidizing atmosphere by flowing 20 l/min of nitrogen gas and 1 l/min of hydrogen gas. Press molding conditions were as follows: temperature of the mold 680° C.; pressure of the press 10 kg/cm; press time 2 min. After the press molding, the glass and the press mold were slowly cooled down to 400° C. to obtain an optical element in which the microlens array was molded on the transparent glass substrate 3, as shown in FIG. 3.

Thin film transistors (TFT) 8 made of amorphous silicon and transparent pixel electrodes 9 made of ITO composing pixels, were formed, as shown in FIG. 4, on the surface of the transparent glass substrate 3, opposite to that molded into the microlens array, and a polarizing plate 10 was provided on the surface with the microlens array 7. The other structure concerned with the display device was the same as in Example 1. As a result, as in Example 1, incident light 16 entered through the microlens array was collected at the transparent pixel electrode 9, the opening area, and the opening factor substantially became great, so that a clear, high quality display was produced.

Example 4

As the base material 1 for a press metal mold, austenitic stainless steel (SUS316) was used, cut into a plate with 50 mm×40 mm×10 mm in dimensions, and, lapped and polished with super-fine diamond powder to obtain a mirror-like surface with around 3 nm in root mean square roughness (RMS). On the mirror-like surface of the base material 1, around 0.8 million concave microlenses were molded at 40 μm pitch by pressing a diamond indenter with 400 μm in radius of curvature with a press molding machine numerically controlled in high precision. This microlens array molded surface was coated, by a sputtering method, with a thin film 2 of rhodium-gold-tungsten (Rh-Au-W) alloy to obtain a press mold. In FIG. 5, 3 is a transparent glass substrate (silica glass, 40 mm×30 mm×1.1 mm), the surface of which is polished, and 4b is a low melting point glass layer made of a lanthanum base glass comprising 8 weight % of zirconia ($ZrO_2$), 30 weight % of lanthanum oxide, ($La_2O_3$) 42 weight % of boric acid ($B_2O_3$), 10 weight % of calcium oxide (CaO) and the remainder of trace materials. The whole surface of the transparent glass substrate 3 was uniformly coated with an around 20 micron thick super-fine lanthanum base glass slurry by a blade coater. After drying it, it was baked for 5 hours in air at 800° C., to therely obtain a coat of a low melting point glass layer 4b. 5 is a plate-like press mold, and 6 a is thin film of rhodium-gold-tungsten (Rh-Au-W) alloy on the base material 5, and they were prepared by the same method as was used for the press mold 1 and 2.

As shown in FIG. 5, the press mold 5 with a plane molding surface, the transparent glass substrate 3, the low melting point glass layer 4b, and the press mold with an array of concaves on the molding surface, were disposed in sequence from the top, and press molded in a molding machine at a high temperature, inside of which was kept under non-oxidizing atmosphere by flowing 20 l/min of nitrogen gas and 1 l/min of hydrogen gas. Press molding conditions were as follows: temperature of the mold 680° C.; pressure of the press 10 kg/cm$^2$; press time 2 min. After the press molding, the glass and the press mold were slowly cooled down to 400° C. to obtain an optical element in which the microlens array was molded on the transparent glass substrate 3, as shown in FIG. 6.

Thin film transistors (TFT) 8 made of amorphous silicon and transparent pixel electrodes 9 made of ITO composing pixels, were formed, as shown in FIG. 7, on the surface of the transparent glass substrate 3, opposite to that molded into the microlens array 7 on the low melting point glass layer 4b, and a polarizing plate 10 was provided on the surface with the microlens array 7. The other structure concerned with the display was the same as in Example 1. As a result, as in Example 1, incident light 16 entered through the microlens array was collected at the transparent pixel electrode 9, the opening area, and the opening factor substantially became great, so that a clear, high quality display was produced.

Example 5

As the base material 1 for a press mold, super hard alloy (WC-5TiC-8Co) was used, cut into a plate with 50 mm×40 mm×10 mm in dimensions, and, lapped and polished with super-fine diamond powder to obtain a mirror-like surface with around 2 nm in root mean square roughness (RMS). On the mirror-like surface of the base material 1, around 0.8 million concave microlenses were molded at 40 μm pitch like matrix by pressing a diamond indenter with 400 μm in radius of curvature with a press molding machine numerically controlled in high precision. This microlens array molded surface was coated, by a sputtering method, with a thin film 2 of platinum-iridium-osmium (Pt-Ir-Os) alloy to obtain a press mold. In FIG. 8, 3 is a transparent glass substrate (40 mm×30 mm×1.1 mm), the surface of which was polished, and made of a borosilicate barium glass comprising 30 weight % of silica (Si$_2$), 50 weight % of barium oxide, 15 weight % of boric acid (B$_2$O$_3$) and the remainder of trace materials. 5 is a base material for a plate-like press mold, and 6 is a thin film of platinum-iridium-osmium alloy on the base material 5, and they were prepared by the same method as was used for the press mold 1 and 2.

As shown in FIG. 8, the press mold 5 with a plane molding surface, the transparent glass substrate 3, and the press mold with an array of concaves on the molding surface, were disposed in sequence from the top, and press molded in a molding machine at a high temperature, inside of which was kept in a non-oxidizing atmosphere produced by flowing 20 l/min of nitrogen gas. Press molding conditions were as follows: temperature of the mold 560° C.; pressure of the press 30 kg/cm$^2$; press time 2 min. After the press molding, the glass and the press metal mold were slowly cooled down to 300° C. and then taken out of the molding machine. The surface of the transparent glass substrate, opposite to the side with the microlens array 7, was coated with a solution of isopropyl alcohol with slight amount of SiO$_2$ mixed in, and baked at 400° C. to form an alkali elution preventive layer 19 with 0.1 micron in thickness. Through such processes, an optical element on which the microlens array 7 was molded and the alkali elution preventive layer 19 was formed, was obtained, as shown in FIG. 9. Thin film transistors (TFT) 8 made of amorphous silicon and transparent pixel electrodes 9 made of ITO composing pixels, were formed, as shown in FIG. 10, on the surface of the transparent glass substrate 3, opposite to that molded into the microlens array 7, and a polarizing plate 10 was provided on the surface with the microlens array 7. The other structure concerned with the display device was the same as in Example 1. As a result, as Example 1, incident light 16 entered through the microlens array was collected at the transparent pixel electrode 9, the opening area, and the opening factor substantially became great, so that a clear, high quality display was produced.

Example 6

As the base material 1 for a press mold, cermet (TiC-10Mo-9Ni) was used, cut into a plate with 50 mm×40 mm×10 mm in dimensions, and, lapped and polished with super-fine diamond powder to obtain a mirror-like surface with around 2 nm in root mean square roughness (RMS). On the mirror-like surface of the base material 1, around 0.8 million concave microlenses were molded at 40 μm pitch like matrix by pressing a diamond indenter with 400 μm in radius of curvature with a press molding machine numerically controlled in high precision. This microlens array molded surface was coated, by a sputtering method, with a thin film 2 of platinum-tantalum-rhenium (Pt-Ta-Re) alloy to obtain a press mold. In FIG. 8, 3 is a transparent glass substrate (40 mm×30 mm×1.1 mm), the surface of which was polished, and made of a lead glass comprising 52 weight % of silica (SiO$_2$), 6 weight % of potassium oxide (K$_2$O), 35 weight % of lead oxide (PbO), 5 weight % of sodium oxide (Na$_2$O) and the remainder of trace materials. 5 is a base material for a plate-like press mold, and 6 is a thin film of platinum-tantalum-rhenium (Pt-Ta-Re) alloy on the base material 5, and they were prepared by the same method as was used for the former press mold.

As shown in FIG. 8, the press mold 5 with a plane molding surface, the transparent glass substrate 3, and the press mold with an array of concaves on the molding surface, were disposed in sequence from the top, and press molded in a molding machine at a high temperature, inside of which was kept in a non-oxidizing atmosphere produced by flowing 20 l/min of nitrogen and 2 l/min of carbon dioxide gas.

Press molding conditions were as follows: temperature of the metal mold 520° C.; pressure of the press 20 kg/cm$^2$; press time 1 min. After the press molding, the glass and the press mold were slowly cooled down to 350° C. and then taken out of the molding machine. The surface of the transparent glass substrate, opposite to the side with the microlens array 7, was applied, by a plasma CVD method, with an around 0.5 micron alkali elution preventive layer 19, under the following filming conditions: reaction gas—SiH$_4$—N$_2$, substrate temperature—350° C., gas pressure—1 Torr, RF power—100 W. Through such processes, an optical element on which the microlens array 7 was molded and the alkali elution preventive layer was formed, was obtained, as shown in FIG. 10.

Thin film transistors (TFT) 8 made of amorphous silicon and transparent pixel electrodes 9 made of ITO composing pixels, were formed, as shown in the FIG. 10, on the surface of the transparent glass substrate 3, opposite to that molded into the microlens array 7, and a polarizing plate 10 was applied to the surface with the microlens array 7. The other structure concerned with the display device was the same as in Example 1. As a result, as in Example 1, incident light 16 entered through the microlens array was collected at the transparent pixel electrode 9, the opening area, and the opening factor substantially became great, so that a clear, high quality display was produced.

In the optical microelement array, the production method and the display device, the following are not limited to the embodiments mentioned above: press molding conditions (temperature, time, pressure and atmosphere); low melting point glass material; transparent glass substrate; base material for the press mold and composition of the thin film coated thereon; display principle and structure of display device.

Hereupon, as the non-oxidizing atmosphere to be preferably adopted, which does not react with or adhere to the glass and these thin films, there are inert gases such as nitrogen, argon, helium, and gases appropriately mixed therewith by hydrogen, carbon oxide including carbon monoxide and carbon dioxide, hydrocarbons including methane, ethane and ethylene, hydrocarbon halides including trichloroethylene and trichloro-trifluoro ethane, alcohols including ethylene glycol and glycerine or fluorocarbons group including F-113 and F-11. Needless to say, coating the surface on the microlens array of the present invention with an anti-reflection film such as magnesium fluoride, is effective for improvement in quantity of transmitted light.

What is claimed is:

1. A micro lens array comprising:
   a glass substrate; and
   a plurality of micro lenses formed on said glass substrate, said micro lenses being made of a glass having a lower melting point than that of said glass substrate.

2. A micro lens array comprising:
   a glass substrate;

a glass layer made of a glass having a lower melting point than that of said glass substrate; and a plurality of micro lenses formed on said glass layer, said micro lenses being made of the same glass material as that of said glass layer.

3. A micro lens array comprising:

a glass substrate having opposite surfaces;

a plurality of micro lenses formed on one of the opposite surfaces of said glass substrate, said micro lenses being made of a glass having a lower melting point than that of said glass substrate; and an alkali elution layer formed on the other of the opposite surfaces of said glass substrate.

4. A display device comprising:

a first glass substrate having formed at one surface thereof a common electrode layer;

a second glass substrate having opposite first and second surfaces and disposed such that the first surface opposes the common electrode layer, the first surface having formed thereon a plurality of pixel electrodes and a plurality of switching elements connected to the pixel electrodes respectively;

a display material layer sandwiched between the common electrode layer and the first surface of the second glass substrate on which the plurality of pixel electrodes and the plurality of switching elements are formed; and a micro lens array composed of a plurality of micro lenses formed on the second surface of the second glass substrate so as to correspond to the plurality of pixel electrodes such that a focal point of each of the plurality of micro lenses is disposed at a corresponding one of the plurality of pixel electrodes, said micro lens array being made of a glass having a lower melting point than that of the second glass substrate.

5. The display device according to claim 4, wherein said display material layer comprises a liquid crystal layer.

6. A display device comprising:

a first glass substrate having formed at one surface thereof a common electrode layer;

a second glass substrate having opposite first and second surfaces and disposed such that the first surface opposes the common electrode layer, the first surface having formed thereon a plurality of pixel electrodes and a plurality of switching elements connected to the pixel electrodes respectively;

a display material layer sandwiched between the common electrode layer and the first surface of the second glass substrate on which the plurality of pixel electrodes and the plurality of switching elements are formed;

a glass layer formed on the second surface of the second glass substrate and has a lower melting point than that of the second glass substrate; and a micro lens array composed of a plurality of micro lenses formed on the glass layer so as to correspond to the plurality of pixel electrodes such that a focal point of each of the plurality of micro lenses is disposed at a corresponding one of the plurality of pixel electrodes, said micro lens array being made of the same glass material as that of the glass layer.

7. The display device according to claim 6, wherein said display material layer comprises a liquid crystal layer.

8. A display device comprising:

a first glass substrate having formed at one surface thereof a common electrode layer;

a second glass substrate having opposite first and second surfaces and disposed such that the first surface opposes the common electrode layer;

an alkali elution preventive layer formed on the first surface of the second glass substrate;

a plurality of pixel electrodes formed on the alkali elution layer and a plurality of switching elements formed on the alkali elution layer and connected to the pixel electrodes respectively;

a display material layer sandwiched between the common electrode layer and the alkali elution layer on which the plurality of pixel electrodes and the plurality of switching elements are formed; and a micro lens array composed of a plurality of micro lenses formed on the second surface of the second glass substrate so as to correspond to the plurality of pixel electrodes such that a focal point of each of the plurality of micro lenses is disposed at a corresponding one of the plurality of pixel electrodes, said micro lens array being made of a glass having a lower melting point than that of the second glass substrate.

9. The display device according to claim 8, wherein said display material layer comprises a liquid crystal layer.

* * * * *